United States Patent [19]

Landmann

[11] Patent Number: 5,438,781
[45] Date of Patent: Aug. 8, 1995

[54] BUILDING SIGN SYSTEM

[76] Inventor: David W. Landmann, 1 Ocean Ter., Cumberland, Me. 04110

[21] Appl. No.: 143,107

[22] Filed: Oct. 29, 1993

[51] Int. Cl.⁶ .................... G09F 7/00; G09F 19/00
[52] U.S. Cl. ........................ 40/584; 40/585; 40/615; 434/72; 434/112; 434/113
[58] Field of Search ............. 40/570, 584, 585, 615; 434/72, 112, 113

[56] References Cited

U.S. PATENT DOCUMENTS

| | | | |
|---|---|---|---|
| 287,837 | 11/1883 | Loomis | 40/657 |
| 1,660,867 | 2/1928 | Downs | 434/431 |
| 2,523,828 | 9/1950 | Howe | 434/96 |
| 4,135,316 | 1/1979 | Saito | 116/205 |
| 4,355,479 | 10/1982 | Thornton | 40/570 |
| 4,385,586 | 5/1983 | Schriever | 116/205 |
| 4,401,050 | 8/1983 | Britt et al. | 40/570 |
| 4,608,939 | 9/1986 | Lampley | 112/260 |
| 4,620,816 | 11/1986 | Kupfer | 404/6 |
| 4,715,743 | 12/1987 | Schmanski | 404/9 |
| 4,895,257 | 1/1990 | Winslow | 40/638 |
| 5,246,757 | 9/1993 | Condon et al. | 40/570 |
| 5,247,756 | 9/1993 | Johnstone | 40/570 |
| 5,284,444 | 2/1994 | Raynes | 434/113 |

FOREIGN PATENT DOCUMENTS 3604609  8/1987  Germany ..................... 434/113

OTHER PUBLICATIONS

"Tactile Maps Will Help Blind Get Around in D.C.", Washington Star, Mar. 3, 1975, p. B-2.

Primary Examiner—Richard A. Bertsch
Assistant Examiner—Howard R. Richman
Attorney, Agent, or Firm—Nixon & Vanderhye

[57]  ABSTRACT

An interior building sign for assisting sighted and visually impaired or blind persons to locate an escape route from point A to point B includes a first planar sheet printed in a first color with a floor plan corresponding to a building floor on which the sign is to be posted. The floor plan is also printed with two dimensional marks in a contrasting color indicating a route from point A to point B. A second planar sheet of substantially transparent material overlies the first planar sheet, the second planar sheet having three dimensional marks machined or routed thereon in substantially overlying relationship with the two dimensional marks to thereby provide a tactile representation of the route. Signs of similar construction have application in non-emergency situations and in other environments including, for example, convention centers, parks and the like.

27 Claims, 6 Drawing Sheets

FIG. 1
THIRD FLOOR FIRE EXITS

THIRD FLOOR
FIRE EXITS

BUILDING SIGN SYSTEM

BACKGROUND AND SUMMARY OF THE INVENTION

The present invention relates to a building sign system designed to assist a wide range of individuals in locating routes to safety in the event of an emergency, or to specific areas or features within a complex.

The Americans With Disabilities Act of 1990 requires that people with disabilities be afforded the same level of accommodations as the general public, and is directly tied to the Civil Rights Act of 1964. The exemplary embodiment of this invention addresses one aspect of those requirements in the sense that it provides blind or visually impaired individuals the information necessary to locate routes to safety from various locations within a building or other enclosure in essentially the same manner as non-disabled persons.

To be sure, there are many known devices and methods for assisting the blind or visually impaired to escape a building (such as a hotel or the like) during an emergency. For example, electronic sensors or wands, "talking signs" utilizing tape recorders and even personal tape recorders are currently in use. These devices/techniques all suffer from serious disadvantages however, and have not proven completely satisfactory. Power outages and the necessity to stand in place and listen to a recording in a "talking sign" are just two of the many drawbacks of currently used systems.

This invention eliminates many of the problems associated with conventional systems by providing a simple, easy to use/understand, and economical system of signs to be posted throughout a building. Thus, in an exemplary embodiment, the invention relates to a unique series of signs to be posted on all floors of a building, and at various locations on each floor. For purposes of discussion here, the sign system of this invention will be described with respect to a single floor of a building. It will be understood that similar arrangements would be utilized for each floor, but each set of signs on a floor will be unique to that particular floor, and each sign on a floor is unique to its own posting location, i.e., no two signs are alike in all respects.

The present invention utilizes two structural components. The first is a paper (or similar) plan of the particular floor where a set of unique signs will be located. Each floor plan, in the conventional style of floor plan illustrations, will indicate the various rooms, corridors, windows, doorways, exits, stairways, etc. This basic floor plan is common to all of the signs located on any given floor. In the exemplary embodiment, each of these identical floor plans is printed with a unique set of highlighted marks (preferably in path form, and of a contrasting color) which direct sighted individuals to the nearest exit in the event of an emergency. In other words, the sign at each location will indicate the location of that particular sign relative to the floor plan as a whole, and the route to be taken from that location to the nearest exit or other area of safety.

The second structural component of the invention is an overlay of Lexan TM or other clear, relatively rigid material placed over the floor plan so that the latter is plainly visible through the overlay. The overlay is machined or routed to provide a series of indentations of appropriate shape which, through tactile sensation, informs blind or visually impaired individuals of the location of the sign relative to a safety route to the next sign, or to the nearest exit or other area of safety directly. The machined indentations in the Lexan TM or other clear material are shaped in accordance with a symbology scheme which, through appropriate education, will allow blind or visually impaired persons to distinguish between, for example, large rooms, hallways, doorways, stairways and direction of movement.

Thus, within the context of the two structural components described above, each sign uses three specific elements to supply information to sighted as well as to blind or visually impaired individuals: (1) a heavily marked floor plan outline; (2) a contrasting color path or route; and (3) a three dimensional route and associated informational symbols.

In practice, signs as described above will be posted at various locations on all of the floors of a building, each sign (on a floor) including a common floor plan, a unique color contrasting path and a unique three dimensional scheme machined into the clear overlay. In the event of an emergency, a blind or visually impaired person, using standardized methodology for locating exits or doorways within an enclosed area (moving from the center to a wall and then moving to the right until an exit doorway is found), will come upon a sign as described above at point A. Through tactile sensation, the person can ascertain their own position and orientation relative to the area within which the sign is posted, and also then ascertain a route to the nearest exit at point B (or other area of safety), or a route to another sign which will provide additional information along an extended path. By confining the machined indentations to the locus of the sign and a nearest route from that locus to an exit or other area of safety, or to another sign, the blind or visually impaired person need not be concerned with the floor plan as a whole, and is therefore less likely to become confused and/or disoriented.

It will also be appreciated that while the exemplary embodiment described herein relates primarily to emergency situations, the invention has non-emergency applications as well. For example, similar signs could be utilized within large complexes, such as shopping malls, convention centers and the like as a means for directing the blind or visually impaired from any of several points $A_1$, $A_2$, or ... $A_n$ to point B. The signs have equal applicability in outdoor environments such as amusement or theme parks, stadiums, nature and hiking trails, and the like.

In its broadest aspect, therefore, the invention relates to a sign for assisting sighted and visually impaired or blind persons to locate a route from point A to point B, the sign comprising a first planar sheet printed with first means for supplying route information to sighted individuals; and a second planar sheet overlying the first planar sheet, including second means for supplying similar route information to blind or visually impaired individuals.

In accordance with another aspect, the present invention relates to a sign for use in buildings for assisting sighted and visually impaired or blind persons to locate a route from point A to point B, the sign comprising a first planar sheet printed in a first color with a floor plan corresponding to a building floor on which the sign is to be posted; the floor plan also printed with two dimensional marks in a contrasting color indicating a route from point A to point B; and a second planar sheet of substantially transparent material in overlying relationship with the first planar sheet, the second planar sheet having three dimensional marks thereon in substantially overlying relationship with the two dimensional marks to thereby provide a tactile representation of the route.

In still another aspect, the invention relates to a system of building signs for assisting sighted and visually impaired or blind persons to locate a route from any of a plurality of points $A_1, A_2, \ldots A_n$ to point B, the sign system comprising a plurality of signs for posting at points $A_1, A_2, \ldots A_n$, each sign comprising a first planar sheet printed with as floor plan corresponding to a building floor on which the sign is to be posted, the floor plan printed in a first color; and the floor plan also printed with two dimensional marks of a color contrasting with the first color indicating a route from points $A_1, A_2, \ldots A_n$, respectively, to point B; and a second planar sheet of substantially transparent material in overlying relationship with the first planar sheet, the second planar sheet having three dimensional marks thereon in substantially overlying relationship with the two dimensional marks to thereby provide a tactile representation of the route.

The building sign system in accordance with this invention has the following unique features: (1) The signs are very quick to read by both sighted and visually impaired or blind individuals; (2) Only the basic information needed to assist the blind or visually impaired individual to the next sign or area of safety is machined into the overlay; (3) Each sign is unique within a larger system of signs; and (4) Each sign uses the elements of heavily marked floor plan, color and three dimensional machining to provide information to both sighted and blind or visually impaired persons.

Utilizing the signage guidelines developed under the Americans With Disabilities Act of 1990, the building sign system in accordance with this invention quickly and easily assists the blind and the visually disabled in locating routes to safety in the event of an emergency.

Other objects and advantages of the invention will become apparent from the detailed description which follows.

DETAILED DESCRIPTION OF THE DRAWINGS

Figure 1:
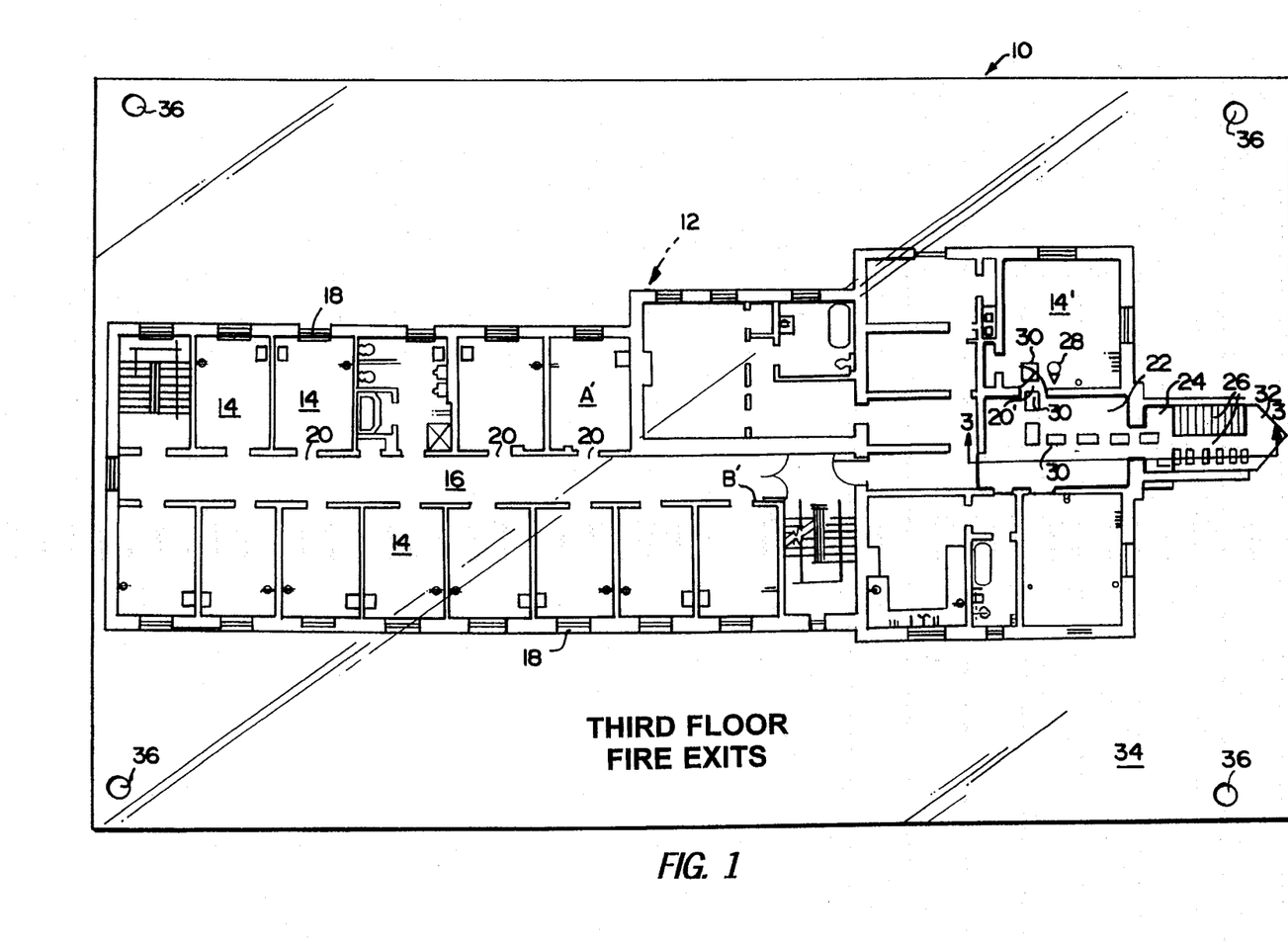
FIG. 1 is a plan view of a building sign in accordance with this invention including a floor plan and clear overlay.

With reference now to FIG. 1, one building sign 10 in accordance with an exemplary embodiment of the invention includes a floor plan layout primed on a paper (or other suitable material) sheet 12. The floor plan illustrates in a conventional manner the location of, for example, individual rooms or offices 14, hallway 16, windows 18, doors 20, reception or other area 22, landing 24, stairs 26 and various other structures on the particular floor. In a preferred embodiment, the floor plan is printed in heavy black lines on a white paper sheet to provide maximum contrast.

It will be understood that all of the signs on any given floor of a building will have a corresponding floor plan illustrated thereon. This common plan will be modified for each sign by adding contrasting color markings (preferably red) to indicate not only the specific posting location of the sign relative to the floor plan, but also to indicate a route to the nearest exit or other area of safety. Thus, with reference again to FIG. 1, the symbol or sign marker 28 (made up of a circle and adjacent triangle so as to form a "pointer") indicates the location of the sign, corresponding to a point A. The colored block 30 immediately adjacent the sign marker 28 constitutes the first of a series of similar blocks 30 forming a path which informs sighted individuals of a route to the nearest exit which, in FIG. 1, extends from room 14', doorway 20', reception area 22, landing 24, and finally to stairs 26. These colored marks 30 can also include an arrowhead 32 at the end of the path to indicate a final direction of movement to the nearest exit door corresponding to a point B. It will be appreciated from the above that each sign on a floor will have its own unique set of colored symbols or marks based on the posting location of that sign in the overall floor plan.

In the exemplary embodiment, the floor plan sheet 12 is overlayed with a panel 34 of Lexan TM or other relatively rigid clear material (such as clear plastic, glass or plexiglass, or non-glare glass or non-glare plexiglass), and includes mounting holes 36 which can be utilized to securely fasten the sign to a wall or other surface. This clear overlay panel 34 allows the underlying floor plan to be viewed without difficulty by sighted individuals. The overlay panel 34, however, is also routed or machined (see FIG. 3) to include three-dimensional symbols or marks which correspond generally (but only) to the colored path described hereinabove. While the routed or machined area within the clear panel 34 is shown in heavy outline in FIG. 1, the routing pattern is shown, for convenience, in an enlarged detail in FIG. 2. Again for convenience and for ease of understanding, reference numerals applied to FIG. 2 correspond to the underlying floor plan areas of FIG. 1. Thus, room 14', reception area 22 and landing 24 are routed or machined to substantially match the floor plan. The stairs 26 are symbolized by raised rectangles 38 (i.e., non-routed areas), best seen in FIGS. 2 and 3. The sign marker 28 is also raised (or non-routed) within the overall indentation of room 14' where the sign is posted. The routed or machined indentation terminates at the arrowhead shaped portion 40 (which overlies the printed arrow 32) which indicates a final direction of movement at the point of exit. While the machined or routed areas differ for each sign, manufacture on a large scale is facilitated by the use of computer controlled tooling, with all of the information relating to floor plans and sign posting locations entered into the computer memory.

With the above described system, the blind person can, through tactile sensation, ascertain his own location and the nearest route to an exit in substantially the same way as a sighted individual interprets the colored marks on the floor plan.

In the example described above in connection with FIGS. 1-3, the sign 10 is located relatively close to an exit. In the event, however, the sign 10 is located somewhere in the middle of the floor plan, then a series of signs may be provided, each directing individuals to the next information sign until, finally, the individual can be directed to the nearest exit or other area of safety by the last of the series of signs.

Figure 3:
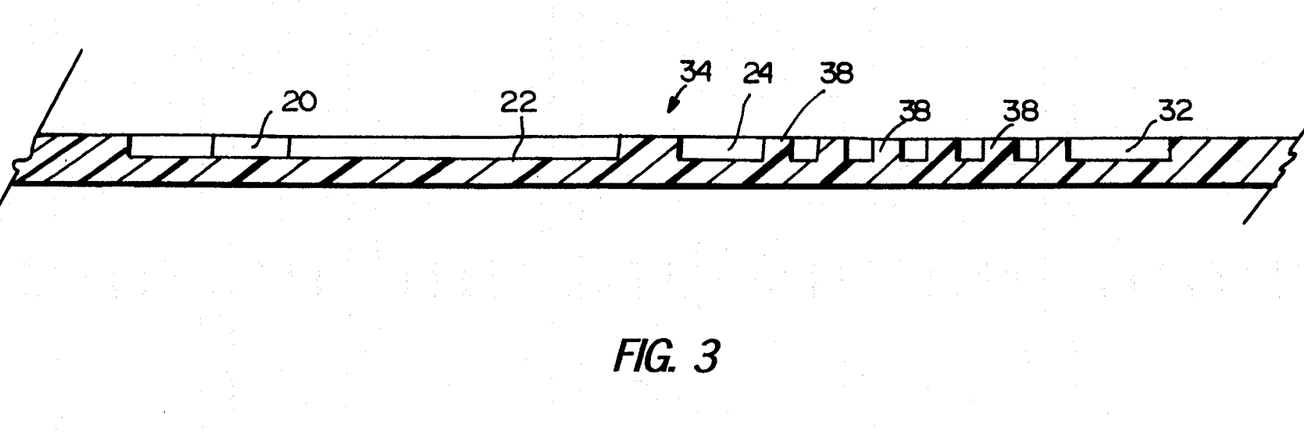
FIG. 3 is a cross section of the overlay, taken along the line 3—3 of FIG. 1.
Figure 4:
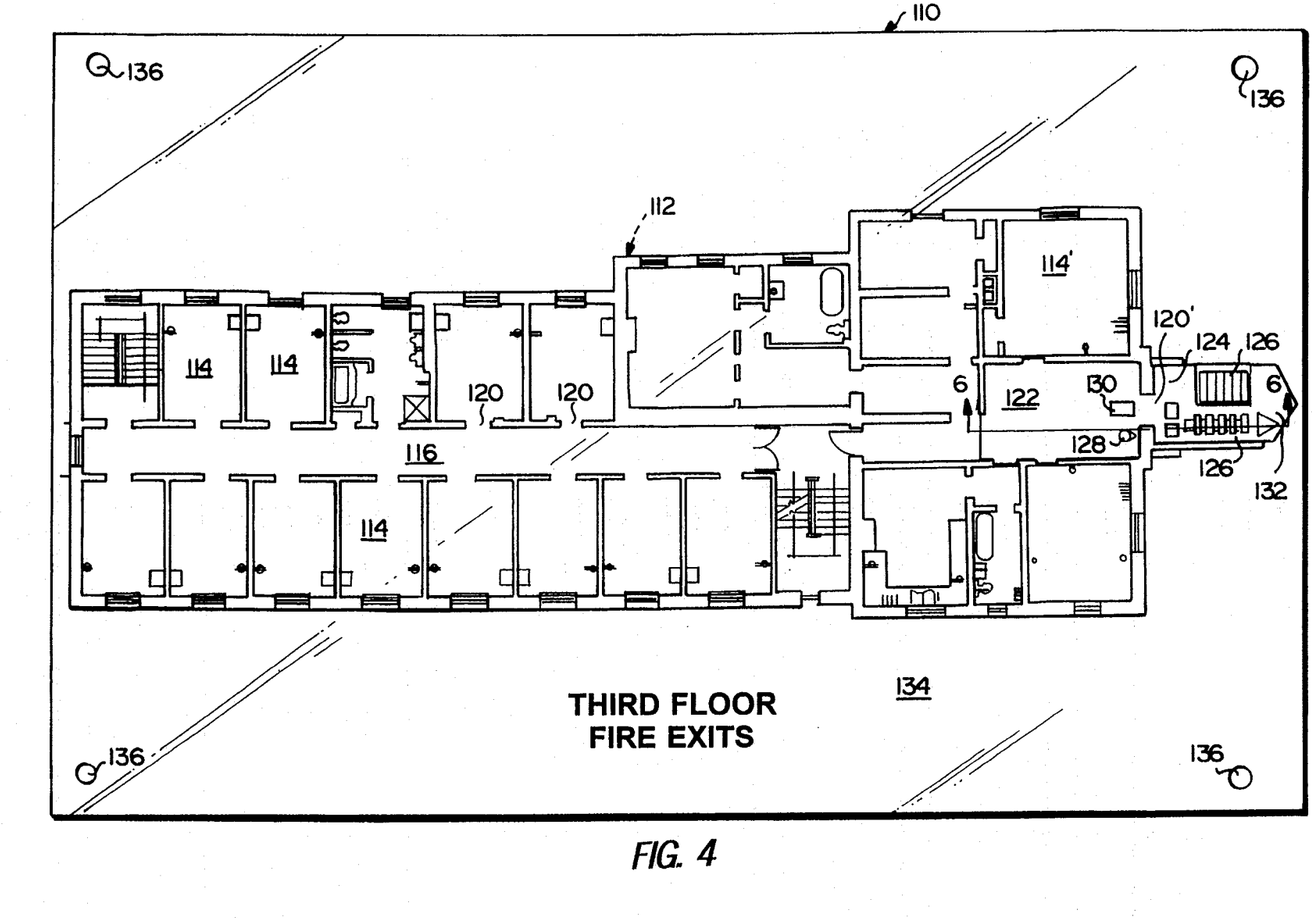
FIG. 4 is a plan view of another sign in accordance with the invention, for posting at a different location but on the same floor as the sign illustrated in FIG. 1.
Figure 5:
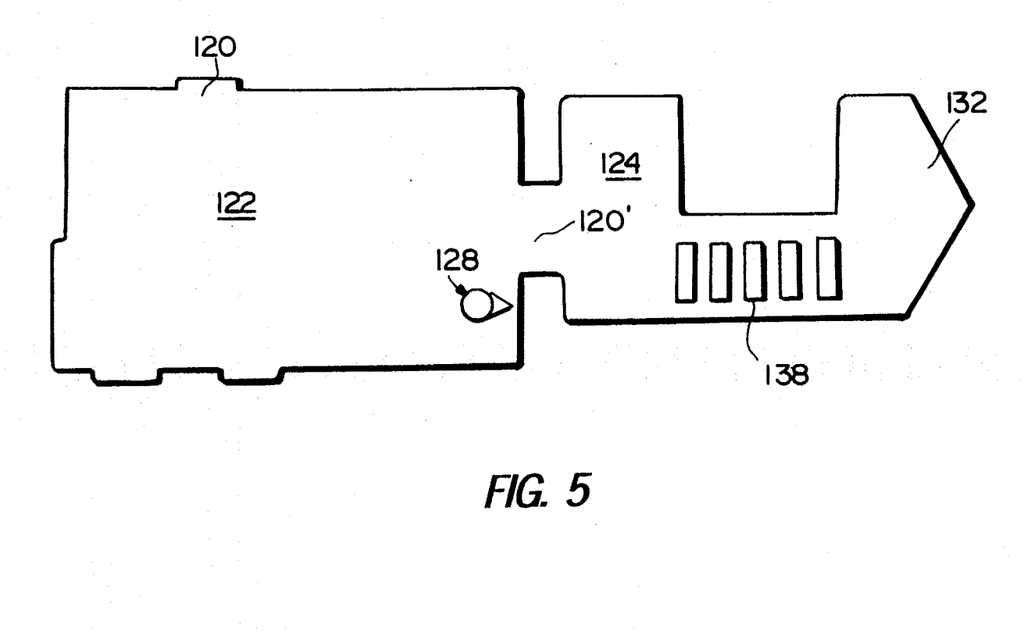
FIG. 5 is an enlarged detail of a machined portion of the sign overlay illustrated in FIG. 4.
Figure 6:
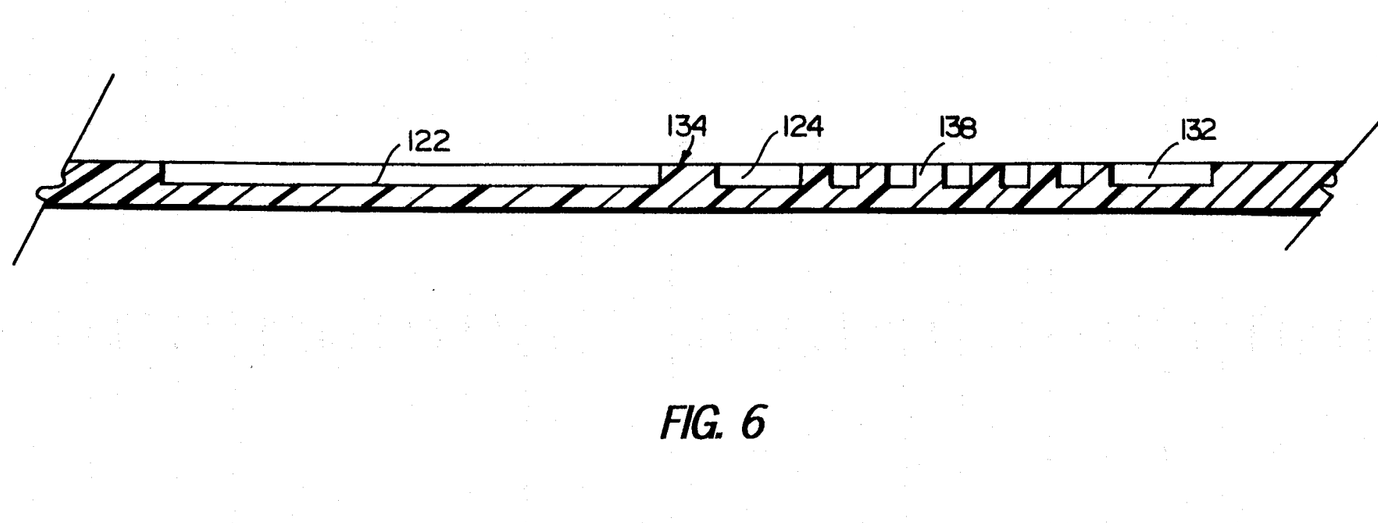
FIG. 6 is a partial cross section of the overlay taken along line 6—6 of FIG. 4.

With reference now to FIGS. 4–6, a sign 110 appropriate for another location on the same floor plan is illustrated. Since FIGS. 4–6 include the same floor plan as FIGS. 1–3, common reference numerals are utilized to indicate common parts of the floor plan, but with the prefix "1" added. The difference between FIGS. 4 and 1 is simply that FIG. 4 contains colored markings and routed indentations unique to the location of the sign, which in this case is located within the reception area 122. In this regard, the sign marker or pointer 128 is now adjacent the doorway from area 122 leading to the landing 124. The sign of FIGS. 4–6 thus illustrates the uniqueness of each sign on a given floor. The manner in which the sign is used is as previously described, and need not be repeated.

As a practical matter, the signs described above will be wall mounted 60 inches above the floor. Preferably, the signs will be posted adjacent doorways, on the latch side of the door. This commonality of posting locations lends overall uniformity and consistency to the system that can be relied upon by blind or visually impaired persons, especially in emergency situations.

In use, and with reference to FIG. 4, a blind or visually impaired person in the reception area 122 would (by conventional training) move from the middle of the area to a wall, and then progress to the right from doorway to doorway (dead-end doors are typically fitted with knurled knobs - exit door knobs are smooth). By working his/her way about the perimeter of area 122, the person will come upon the sign 110, and by tactile inspection, the person will understand that he/she is in the area 122, and that sign 110 is posted to the right of doorway 120'. He/she will also understand his/her own orientation relative to the sign 110 and doorway 120' by the pointed end of symbol 128. Further tactile inspection will inform the individual of the route to the exit by way of landing 124, stairs 126 and a final exit direction as indicated at 140. By limiting the amount of information provided to the blind or visually impaired person to only that which is necessary to escape, the chances of confusion and/or disorientation are minimized.

The sign is utilized in essentially the same manner by sighted individuals, who rely on the marker 128 and colored blocks 130 for the information necessary to reach an exit or other area of safety.

Figure 2:
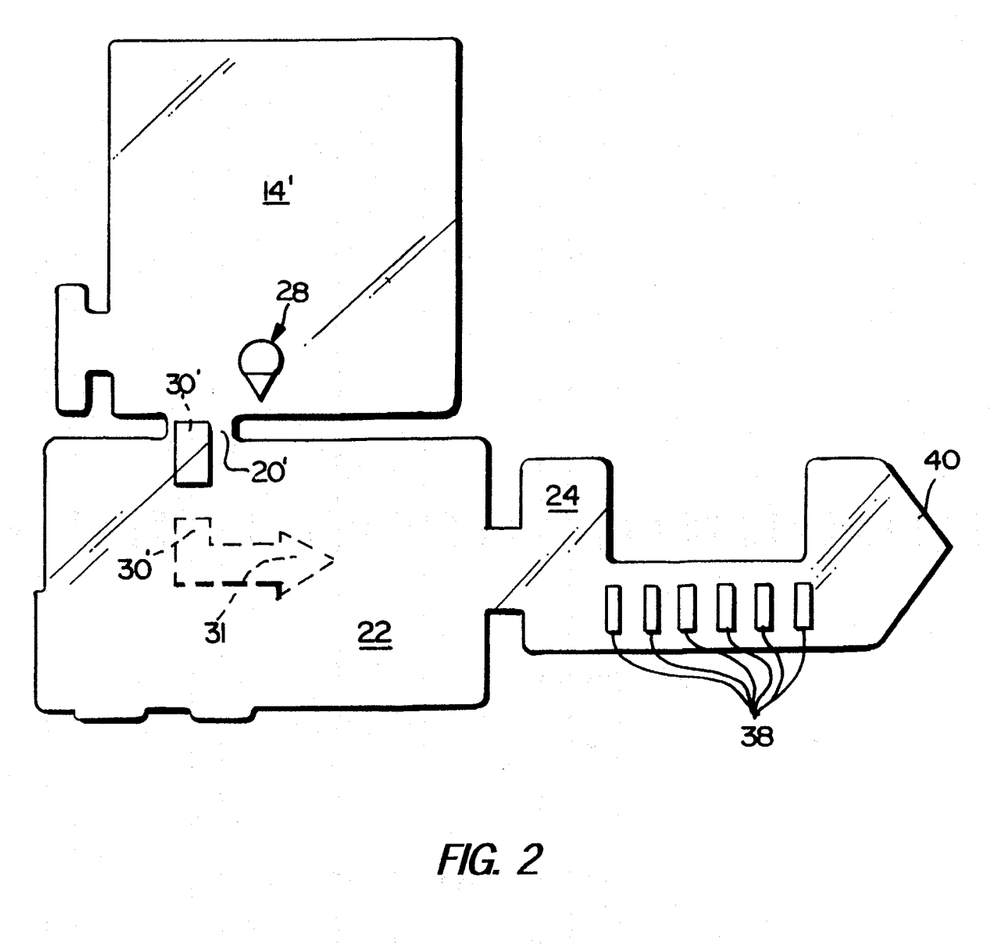
FIG. 2 is an enlarged detail of a machined portion of the sign overlay illustrated in FIG. 1.

Various modifications to the above described signs are contemplated within the scope of the invention. For example, the routed indentations may take different forms and may be modified to provide even more information to the blind or visually impaired. In FIG. 2, for example, raised (non-routed) symbols 30' (shown in phantom) are included in the indented area, and correspond generally to a combination of the second and third blocks 30 in FIG. 1. These raised symbols, including the arrowhead 31, serve to convey direction of movement information quickly to the blind or visually impaired person, and specifically to the change in direction upon exiting the doorway 20', toward the landing 24 and stairs 26. Other techniques for supplying direction of movement information can be employed as well, such as changing the depth of indentations representing ramps, stairs, etc. by, for example, increasing the depth of the indentations (or height of raised projections) in the direction of movement.

The shapes of the indentations representing the different areas (and also the sign posting symbol 28) may also be modified in accordance with different symbology schemes.

As already noted, the above described signs, with suitable modification, may be used in non-emergency situations (in both inside and outside environments) to provide route information from for example, point A' to point B' (see FIG. 1) where point A' is the posting location of one sign and point B' is either a destination or a posting location of another sign. It will be appreciated that for purposes of this example, the floor plan of FIG. 1 is merely used for convenience and not for a specific sign construction for points A' or B' (and/or points therebetween). Obviously, the underlying sheet will be modified as appropriate to include, for example, exposition layout on a convention floor, attraction layout in a theme park, etc.

Finally, it should be noted that the size of the signs can vary within certain limits. In other words, the signs must be large enough to enable accurate information to be conveyed through tactile inspection of the routed areas. At the same time, however, the signs may not be so large as to conflict with size restrictions for signs in general.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A sign for assisting sighted and visually impaired or blind persons to locate a route from point A to point B, the sign comprising:
   a first planar sheet printed with first means for supplying route information to sighted individuals; and
   a second planar sheet overlying said first planar sheet, including second means for supplying similar route information to blind or visually impaired individuals, said second means including tactile information indicating relative locations of point A and point B and a route therebetween.

2. The sign of claim 1 wherein said first and second means are configured as a function of a posting location of the sign.

3. The sign of claim 1 wherein said second means comprises indentations in said second planar sheet.

4. An interior building sign for assisting sighted and visually impaired or blind persons to locate a route from point A to point B, the sign comprising:
   a first planar sheet printed in a first color with a floor plan corresponding to a building floor on which the sign is to be posted; said floor plan also printed with two dimensional marks in a contrasting color indicating a route from point A to point B; and
   a second planar sheet of substantially transparent material in overlying relationship with said first planar sheet, said second planar sheet having three dimensional marks thereon in substantially overlying relationship with said two dimensional marks to thereby provide a tactile representation of said route.

5. The sign of claim 4 wherein said second planar sheet is relatively rigid and wherein at least some of said three dimensional marks are routed therein.

6. The sign of claim 4 wherein said two dimensional marks and said three dimensional marks are unique to a posting location of the sign relative to the floor plan.

7. The sign of claim 4 wherein, except for said three dimensional marks, said second planar sheet is substantially smooth.

8. The sign of claim 4 wherein at least some of said three dimensional marks comprise shapes symbolic of floor plan structures.

9. The sign of claim 8 wherein said structures include floor space, doorways and stairways.

10. The sign of claim 8 wherein said three dimensional shapes also include at least one shape symbolic of a direction of movement.

11. The sign of claim 8 wherein said three dimensional shapes also include at least one shape symbolic of a posting location of the sign.

12. The sign of claim 11 wherein said three dimensional shapes also include at least one shape symbolic of a direction of movement.

13. The sign of claim 4 wherein point A corresponds to a posting location of the sign and point B corresponds to a nearest building fire exit.

14. The sign of claim 4 wherein point A corresponds to a posting location of the sign and point B corresponds to a posting location of another sign.

15. The sign of claim 4 wherein point A corresponds to a posting location of the sign and point B corresponds to another location on the floor.

16. A system of building signs for assisting sighted and visually impaired or blind persons to locate a route from any of a plurality of points $A_1, A_2, \ldots A_n$ to point B, the sign system comprising:

a plurality of signs for posting at points $A_1, A_2, \ldots A_n$, each sign comprising a first planar sheet printed with a floor plan corresponding to a building floor on which the sign is to be posted, said floor plan printed in a first color; said floor plan also printed with two dimensional marks of a color contrasting with said first color indicating a route from points $A_1, A_2, \ldots A_n$, respectively, to point B; and a second planar sheet of substantially transparent material in overlying relationship with said first planar sheet, said second planar sheet having three dimensional marks thereon in substantially overlying relationship with said two dimensional marks to thereby provide a tactile representation of said route.

17. The sign of claim 16 wherein said second planar sheet is relatively rigid and wherein at least some of said three dimensional marks are routed therein.

18. The sign of claim 16 wherein said two dimensional marks and said three dimensional marks are unique to a posting location of the sign relative to the floor plan.

19. The sign of claim 16 wherein, except for said three dimensional marks, said second planar sheet is substantially smooth.

20. The sign of claim 16 wherein at least some of said three dimensional marks comprise shapes symbolic of floor plan structures.

21. The sign of claim 20 wherein said structures include floor space, doorways and stairways.

22. The sign of claim 20 wherein said three dimensional shapes also include at least one shape symbolic of a direction of movement.

23. The sign of claim 20 wherein said three dimensional shapes also include at least one shape symbolic of a posting location of the sign.

24. The sign of claim 23 wherein said three dimensional shapes also include at least one shape symbolic of a direction of movement.

25. The sign of claim 16 wherein points $A_1, A_2, \ldots A_n$ correspond to a posting location of the sign and point B corresponds to a nearest building fire exit.

26. The sign of claim 16 wherein points $A_1, A_2, \ldots A_n$ correspond to a posting location of the sign and point B corresponds to a posting location of another sign.

27. The sign of claim 16 wherein point A correspond to a posting location of the sign and point B corresponds to another location on the floor.

* * * * *